United States Patent [19]
Copple

[11] Patent Number: 5,877,610
[45] Date of Patent: Mar. 2, 1999

[54] MULTIPLE CELL BOOST CONVERTER

[75] Inventor: Earl James Copple, Arlington Heights, Ill.

[73] Assignee: Northrop Grumman Corporation, Los Angeles, Calif.

[21] Appl. No.: 943,767

[22] Filed: Oct. 6, 1997

[51] Int. Cl.[6] .............................. G05F 1/10; H02M 3/335
[52] U.S. Cl. ........................... 323/222; 323/225; 363/21; 363/17
[58] Field of Search ..................................... 323/222, 224, 323/225; 363/21, 20, 17, 97, 98, 71

[56] References Cited

U.S. PATENT DOCUMENTS

| | | | |
|---|---|---|---|
| 4,437,146 | 3/1984 | Carpenter | 363/21 |
| 4,513,361 | 4/1985 | Rensink | 363/21 |
| 4,607,319 | 8/1986 | Assow et al. | 363/20 |
| 4,677,367 | 6/1987 | Goodman | 323/222 |
| 4,695,933 | 9/1987 | Nygen et al. | 363/17 |
| 4,814,684 | 3/1989 | McCurdy | 323/222 |
| 4,940,929 | 7/1990 | Williams | 323/222 |
| 5,038,263 | 8/1991 | Marrero et al. | 363/20 |
| 5,140,182 | 8/1992 | Ichimura | 307/296.1 |
| 5,144,222 | 9/1992 | Herbert | 323/271 |
| 5,293,111 | 3/1994 | Weinberg | 323/222 |
| 5,390,099 | 2/1995 | Rilly et al. | 363/16 |
| 5,495,164 | 2/1996 | Heng | 323/222 |

*Primary Examiner*—Peter S. Wong
*Assistant Examiner*—Rajnikant B. Patel
*Attorney, Agent, or Firm*—Terry J. Anderson; Karl J. Hoch, Jr.

[57] ABSTRACT

A power converter is disclosed that includes multiple lower power boost converters interconnected to reduce the magnitude of the input current ripple and output current ripple by distributing the converter current draw over time, as compared to a single boost converter. The operating cycle of each of the multiple boost converters is phase shifted with respect to the others. The converter described converts a primary input DC voltage into an output DC voltage, wherein the output DC voltage is higher than the primary input DC voltage. The converter includes a primary input terminal for receiving the primary input DC voltage and a plurality of boost converter cells, each of which has an input connected to the primary input terminal, and each of which has an output. The converter additionally includes a master controller for causing each boost converter cell to operate in a predetermined phase relationship with respect to the other boost converter cells. An output filter is connected to the output of each boost converter cell for summing the outputs of the boost converter cells to produce the output DC voltage. A feedback from the converter output terminal through the master controller to each boost converter cell provides an error command to each boost converter cell to accomplish output voltage regulation.

16 Claims, 2 Drawing Sheets

BOOST CONVERTER

INPUT CURRENT WAVEFORM

CONVENTIONAL BOOST CONVERTER

INPUT CURRENT WAVEFORM

MULTIPLE CELL CONVERTER

MULTIPLE CELL BOOST CONVERTER

BACKGROUND OF THE INVENTION

The present invention is a boost switching power converter. More specifically, the present invention is a power converter for producing a DC voltage higher than that of the primary voltage source. The boost converter of the present invention is particularly adapted for use in high power applications.

A common primary electrical power found in aircraft is either +28 volt DC (VDC) or three phase 115 volt AC (VAC), which is rectified and filtered to approximately 270 VDC. Many types of equipment have been designed to operate from either of these power sources. The present invention may be used in applications in which +28 VDC is converted to +270 VDC.

Boost converters have been used for some time to convert a low DC voltage into a higher DC voltage. A common boost converter includes an inductor, a diode, an output capacitor, and a power switching device. These converters for producing a voltage higher than the voltage of the primary source are sometimes referred to as "step-up" converters.

A common, known boost converter, or step up voltage converter, is shown in FIG. 1. Operation of the illustrated boost converter is well understood in the art.

An input terminal 11 receives the input DC voltage ($V_{in}$). An input capacitor 13 is connected between the input terminal 11 and ground. A current sense transformer 23 feeds a sample of the inductor current back into a regulator control 31. An inductor 21 having inductance L1 is connected to the input terminal 11 through the primary of the current sense transformer 23. A switch, such as a Field Effect Transistor (FET) 41, is connected between the "output" side of the inductor 21 and a second terminal, such as ground. The switching element 41 is controlled by a regulator control 31. The regulator control 31 governs the time the switch is on (conductive) or off (nonconductive). A rectifying diode 61 couples the output side of the inductor 21 to the converter output terminal 81. The converter output voltage $V_{out}$ is produced on the converter output terminal 81. An output filter capacitor 91 is connected between the output terminal and ground.

When the FET 41 is conductive, energy from the input terminal 11, passing through the current sense transformer 23, charges the inductor 21. When the FET 41 is not conductive, that energy is discharged through the diode 61 to charge the output capacitor 91. The regulator control 31 includes gate control circuitry and cycles the switch on and off. The regulator control governs the ratio of the time the FET is conductive (on) and nonconductive (off) so that the output voltage $V_{out}$ on the converter output terminal 81 remains constant. The regulator control adjusts the on/off cycle of the switch 41 by monitoring the voltage on the converter output terminal 81 through a feedback line 35.

As the regulator control 31 turns the transistor 41 off, the voltage at the drain of the FET 41 rises to the boost converter voltage $V_{out}$, plus some overshoot due to unwanted parasitic elements.

The current drawn by the boost converter at particular times in its operating cycle can peak at a very high value, much higher than the DC input current or the DC output current. Even at moderate power levels, high peak currents make filtering difficult at both the input and the output.

SUMMARY OF THE INVENTION

The present invention is a power converter that includes multiple lower power boost converters interconnected to reduce the magnitude of the input current ripple and output current ripple by distributing the converter current draw over time. The operating cycle of each of the multiple boost converters is phase shifted with respect to the others so that each draws current at a different time.

The present invention is a converter for converting a primary input DC voltage into an output DC voltage, wherein the output DC voltage is higher than the primary input DC voltage. The converter includes a primary input terminal for receiving the primary input DC voltage and a plurality of boost converter cells, each of which has an input connected to the primary input terminal, and each of which has an output. The converter additionally includes a master controller for causing each boost converter cell to operate in a predetermined phase relationship with respect to the other boost converter cells. The master controller additionally includes a precision voltage reference and an error amplifier. A feedback line connects the converter output to the precision reference of the master controller. An analog error voltage is produced by the error amplifier and sent to each boost cell. This feedback accomplishes output voltage regulation. An output filter is connected to the output of each boost converter cell for summing the outputs of the boost converter cells to produce the output DC voltage.

It is an object of the present invention to provide a DC to DC voltage step up converter that has reduced alternating current peaks.

It is an object of the present invention to provide a DC to DC voltage step up converter that permits easier filtering of the input and output.

It is an object of the present invention to provide a DC to DC voltage step up converter that has reduced current ripple magnitude.

It is an object of the present invention to provide a power converter that has decreased electro-magnetic interference problems.

It is an object of the present invention to provide a power converter that has improved efficiency.

It is an object of the present invention to provide a power converter that has fewer switching losses.

It is an object of the present invention to provide a high wattage power converter that uses smaller components.

DETAILED DESCRIPTION

Figure 1:
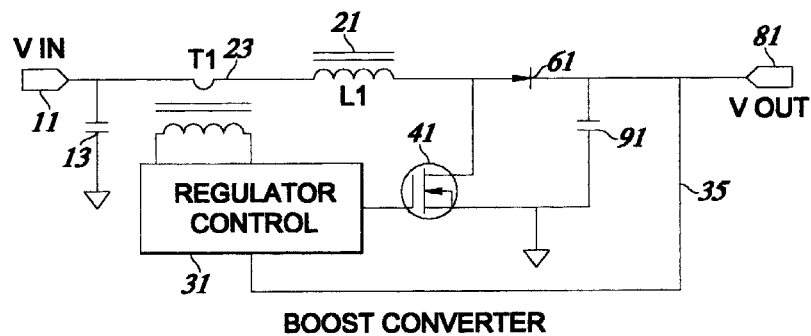
FIG. 1 is a schematic diagram of a conventional boost converter.
Figure 2:
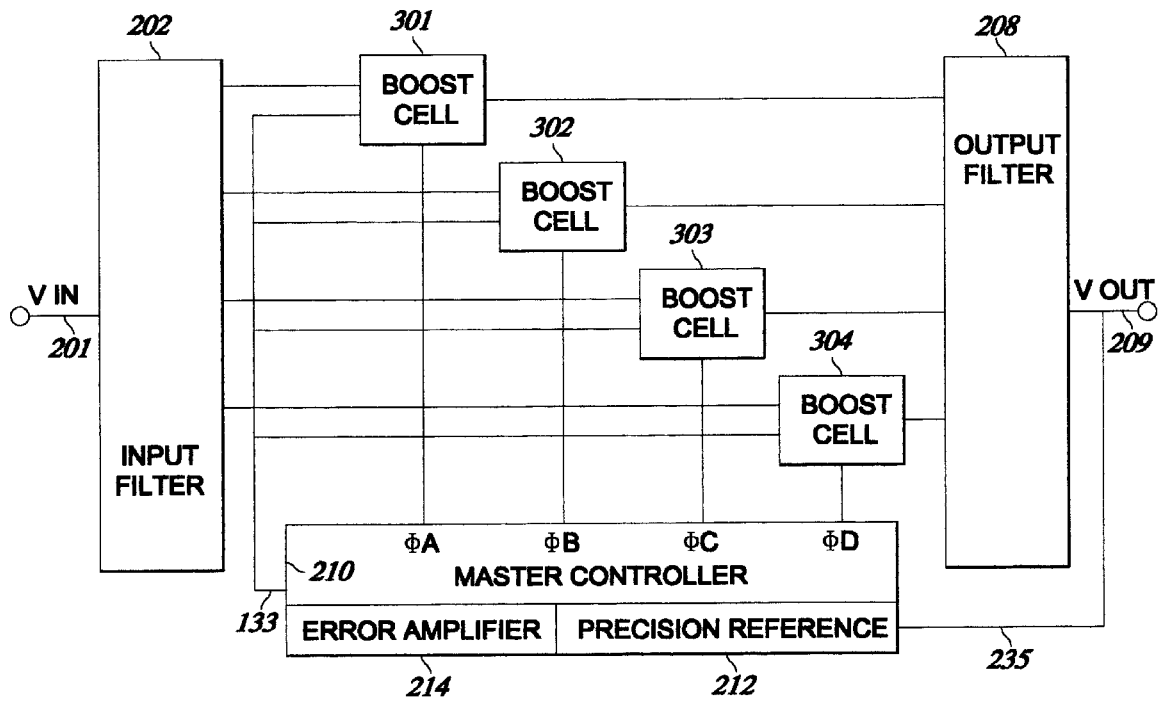
FIG. 2 is a block diagram of a multiple cell boost converter constructed in accordance with the present invention.

FIG. 2 illustrates a multiple cell boost converter constructed in accordance with the invention. The multiple cell boost converter includes a primary input terminal 201 for receiving a primary input voltage $V_{in}$. The final boosted output voltage $V_{out}$ is produced on a final output terminal 209.

An input filter and circuitry 202 is connected to the primary input terminal 201 to filter the input current. Controlling changes in the input current reduces ripple voltage. An output filter and circuitry 208 filters the current near the output terminal to reduce the ripple voltage in the boosted voltage before it appears at the final output terminal 209.

A plurality of individual boost cells 301, 302, 303, 304 are connected between the input filter and circuitry 202 and the output filter and circuitry 208. The output filter and circuitry 208 adds the outputs of the multiple individual boost converter cells.

The individual boost cells 301, 302, 303, 304 are powered from the same input network 202. The individual boost cells deliver output power to the same output filter network 208. The construction of those input and output filter networks 202, 208 are well understood by those skilled in the art. Both filter networks 202, 208 are determined by a comparison of the ripple current magnitude and the allowable ripple voltage as is amply understood in the art. With respect to the input filter 202, there may be some additional bulk energy storage capability, as is understood by those skilled in the art.

Each individual boost converter cell 301, 302, 303, 304 generates an output voltage equivalent to the final output voltage $V_{out}$ and is duty cycle controlled by a feedback signal on the feedback line 133 from the master controller 210. Each of the boost converter cells generates a fraction of the power that would be produced by a single boost converter. If each cell of a multiple cell converter having x cells generates the same fraction of the total system power, each cell generates 1/x of the system power. Thus, in the illustrated embodiment with four converter cells, each cell produces ¼ of the system power. If the boost converter system produces 500 watts, each boost converter cell generates 125 watts. The output filter and circuitry adds the power output from the individual boost converter cells.

The current drawn by a boost converter is roughly proportional to the power developed by the boost converter. A lower power boost converter draws less current than a higher power boost converter. Thus, each lower power boost converter cell draws a smaller current peak during its operational cycle than would a single converter developing the full power.

The operational cycles of all the boost converter cells 301, 302, 303, 304 will be approximately the same length. In accordance with the invention, the operational cycle of each individual boost cell is phase shifted with respect to the operational cycle of the other boost converter cells so that each cell draws its peak current at a different time.

By operating multiple lower power boost converters in a phase shifted arrangement, the system distributes the current draw of the boost conversion process over time so that the magnitude of the current peaks is reduced over that which occurs with a single boost converter.

Thus, the boost cells are phase shifted to produce optimum ripple reduction. Optimally, the operational cycles of the boost cells are evenly distributed over the complete cycle time of the cells. Thus, the phase shift between boost cells is 360 degrees divided by the number of cells.

The embodiment illustrated contains four boost cells. Therefore, the phase shift between boost cells is 90 degrees. Each cell will become active 90 degrees after the preceding cell. The operational cycle boost of cell 302 operates 90 degrees later than does the cycle of boost cell 301. Similarly, boost cell 303 operates 90 degrees later than does boost cell 302, and the operational cycle of boost cell 304 is 90 degrees delayed with respect to the cycle of cell 303. If five boost cells were included in the multiple cell boost converter, the phase shift between boost cells would be 72 degrees.

A master controller 210 governs the phase shifting of the boost cells. As will be understood by those skilled in the art, the master timing controller can be changed to drive various numbers of boost cells. For example, 2, 3, 4, 5, 6, 8, or 10 cells can be included. The master controller includes a regulator function, fault processing, and master timing pulse generation.

The master controller 210 also contains a precision voltage reference 212, and an error amplifier 214. A sample of the output voltage is fed back to the master controller through the output feedback line 235. The output feedback line 235 is connected to the converter output terminal 209. The output voltage sample is compared with the precision reference voltage in the precision reference 212. From that comparison, the error amplifier 214 produces an analog error voltage. The analog error voltage is transmitted to each boost cell 301, 302, 303, 304 through the connection 133. The feedback provided by this error signal to each boost cell accomplishes output voltage regulation.

The multiple individual booster cells, each operating in a phase delayed relation with the others, draw current more frequently than would a single boost converter. The system also draws current more frequently than does each individual cell, since each cell draws a current peak out of phase with the others. The current has peaks associated with the operation of each boost cell. Again referring to the embodiment shown in FIG. 2 having four boost cells, each of the four cells draws a current peak. The cumulative ripple frequency is four times the ripple frequency of each individual cell.

Figure 3:
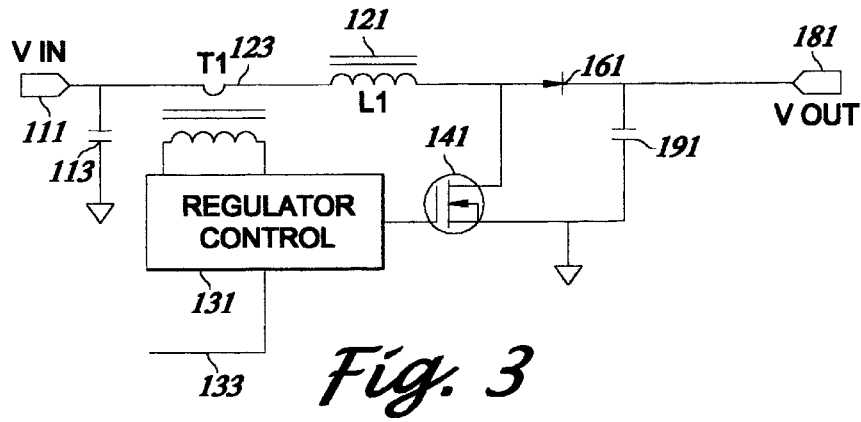
FIG. 3 is a schematic diagram of a representative boost converter cell that may be used in the multiple cell boost converter of the present invention.

An embodiment of an exemplary boost cell such as can be used in the present invention is shown in FIG. 3. The boost cell includes a cell input terminal 111, a current sense transformer 123, an inductor 121, an output diode 161, an output capacitor 191, and a power switching device 141, such as a FET. Gate drive circuitry in the regulator control 131 governs the operation of the switch 141. An input capacitor 113 is connected between the input terminal 111 and ground. The cell output voltage appears on a cell output terminal 181. The feedback line 133 from the error amplifier 214 is connected to the regulator control 131.

Each individual cell 301, 302, 303, 304 may be constructed in any of several forms, many of which are well understood. Among the possibilities are a conventional boost converter, a flyback converter, or a half-bridge converter. In addition, a reboost converter such as is described in copending application Ser. No. 08/874,852, for REBOOST CONVERTOR assigned to the common assignee may be used.

In a well designed boost converter, the dominant losses are in the switching transistor 141. The majority of those losses are due to switching. Generally speaking, the switching losses decrease as the frequency of operation decreases. In the multiple cell converter described here, each boost cell operates at a moderately low frequency, such as 50 KHz. The apparent ripple frequency is multiplied by the number of individual boost cells. Thus, in the illustrated embodiment incorporating four boost cells, the input and output filters are exercised at 200 KHz. In addition, lower power boost converters generally have lower switching losses.

Figure 4A:
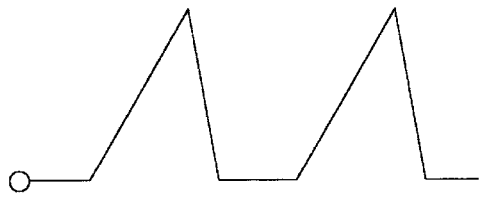
FIG. 4a is an approximate sketch of the current flow in a conventional boost converter.

By distributing the input current over time, the ripple profile is rendered more favorable for the filter. For example, referring to FIG. 4a, an approximation of the input current over time in a conventional boost converter is shown. A peak current of relatively low frequency, but high amplitude is present.

Figure 4B:
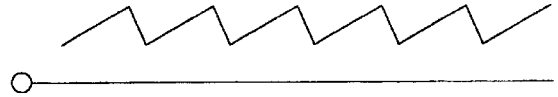
FIG. 4b is an approximate sketch of the current flow in a multiple cell boost converter constructed in accordance with the invention.

Shown in FIG. 4b is an approximation of the input ripple current in the multiple cell converter of FIG. 2 is shown. The current peak has four times the frequency, but each peak is substantially lower. The RMS current is approximately 0.23 times the RMS current shown in FIG. 4a for the single boost converter.

So reducing the current peaks reduces the input and output filtering requirements. The improved ripple also decreases electromagnetic interference (EMI) issues.

Those skilled in the art will recognize that other modifications can be made to the power converter embodiments described above without departing from the spirit of the invention. Therefore, the above embodiments are to be considered exemplary, and not limiting.

Figure 5:
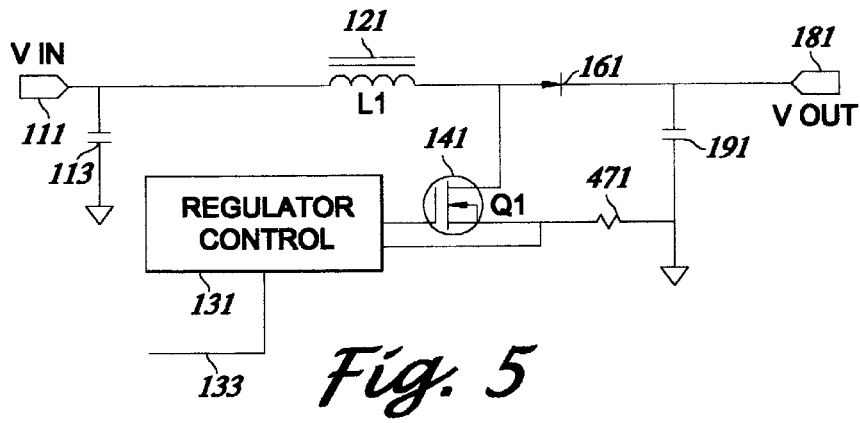
FIG. 5 is a schematic diagram of an alternate configuration for a boost converter cell that may be used in the multiple cell boost converter of the present invention.

For example, it is common in boost converters to not use a transformer at the input for current sensing. An arrangement for the boost converter cell such as is shown in FIG. 5 may be used. This structure is well understood by those skilled in the art. Instead of the transformer 123 (FIG. 3), a low value resistor 471 is connected between the source lead of the FET 141 and ground. The signal at the junction of the source lead of the FET 141 and the resistor 471 may be fed into the regulator control 131 as a sample of the current.

Other variations of the details described above, particularly with respect to the structure of the boost converter cells 301, 302, 303, 304 will suggest themselves to those skilled in the art.

What is claimed is:

1. A converter for converting a primary input DC voltage into an output DC voltage, wherein the output DC voltage is higher than the primary input DC voltage, the converter comprising:
   a primary input terminal for receiving the primary input DC voltage;
   a plurality of boost converter cells, each of which has an input connected to the primary input terminal, and each of which has an output;
   a master controller the master controller being operative to individually regulate the operating cycle of each boost converter cell to cause each boost converter cell to operate in a predetermined phase relationship with respect to at least one other boost converter cell; and
   an output filter connected to the output of each boost converter cell for summing the outputs of the boost converter cells to produce the output DC voltage.

2. The converter of claim 1, wherein the predetermined phase relationship is that the phase shift between boost converter cells is substantially equal.

3. The converter of claim 2, wherein the converter includes x boost converter cells, and the phase shift between adjacent boost converter cells is (360/x) degrees.

4. The converter of claim 2, wherein the converter includes four boost converter cells and the phase shift between boost converter cells is 90 degrees.

5. The converter of claim 4, wherein the converter generates a final output power, and each boost converter cell generates one quarter the final output power.

6. The converter of claim 2, wherein the converter includes five boost converter cells, and the phase shift between boost converter cells is 72 degrees.

7. The converter of claim 6, wherein the converter generates a final output power, and each boost converter cell generates one fifth the final output power.

8. The converter of claim 1, wherein each cell comprises a boost converter including an inductor, a current sense transformer, a diode, an output capacitor, and a power switch, and wherein the master controller is connected to each power switch.

9. The converter of claim 1 wherein the master converter regulates the phase shifting of each boost cell.

10. The converter of claim 9 wherein the master converter regulates the output voltage of each boost cell.

11. The converter of claim 9 wherein the master converter is directly connected to each boost cell.

12. A converter for converting a primary input DC voltage into an output DC voltage, wherein the output DC voltage is higher than the primary input DC voltage, the converter comprising:
   a primary input terminal for receiving the primary input DC voltage;
   a plurality of boost converter cells, each of which has an input connected to the primary input terminal, and each of which has an output, wherein each boost converter cell operates on a boost cycle to generate an intermediate voltage, and the length of the boost cycle of each boost converter is the same;
   a master controller connected to each boost converter cell the master controller being operative to individually regulate the operating cycle of each boost converter cell, in response to the sensed output DC voltage, to cause the boost cycle of one boost converter cell to begin a predetermined amount of time later than the boost cycle of another boost converter cell; and
   an output filter connected to the output of each boost converter cell for summing the outputs of the boost converter cells to produce the output DC voltage.

13. The converter of claim 12, additionally comprising a feedback connection from the converter output to the master controller, and wherein the master controller provides voltage feedback to each boost cell.

14. The converter of claim 12 wherein the master converter regulates the phase shifting of each boost cell.

15. The converter of claim 14 wherein the master converter regulates the output voltage of each boost cell.

16. The converter of claim 14 wherein the master converter is directly connected to each boost cell.

* * * * *